Aug. 1, 1967  J. P. LANDIS  3,334,290
INVERTER CIRCUIT
Filed April 1, 1964
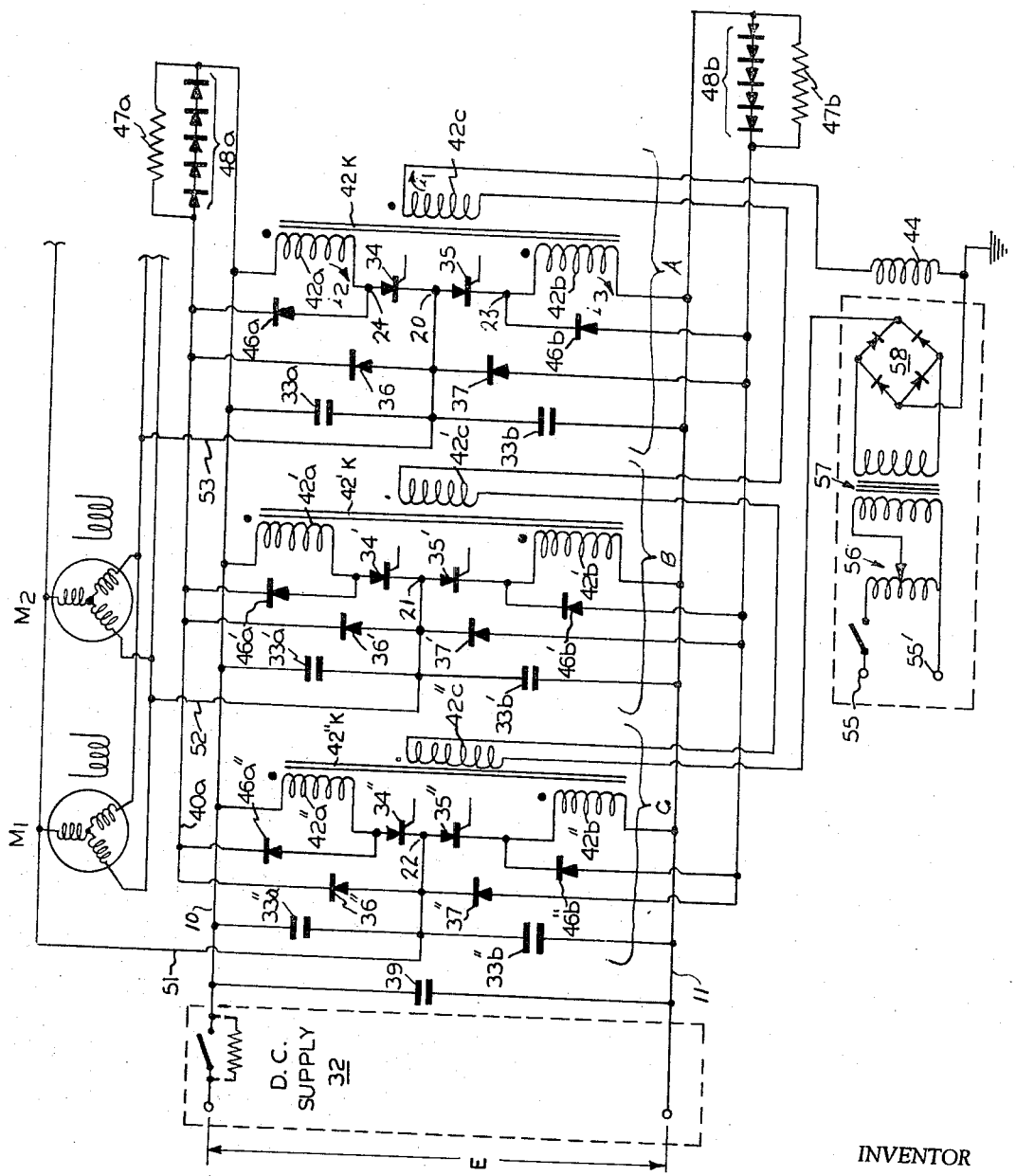
INVENTOR
JAMES PHILIP LANDIS
BY  *Harry E. Braddock*
ATTORNEY

United States Patent Office 3,334,290
Patented Aug. 1, 1967

3,334,290
INVERTER CIRCUIT
James Philip Landis, Wauwatosa, Wis., assignor to E. I. du Pont de Nemours and Company, Wilmington, Del., a corporation of Delaware
Filed Apr. 1, 1964, Ser. No. 356,408
7 Claims. (Cl. 321—16)

ABSTRACT OF THE DISCLOSURE

In a DC to AC power inverter, SCR switch elements are used in combination with saturable reactors arranged to limit commutation and overload currents but not normal load currents and a branch circuit to divert commutation reset energy around the switch elements.

---

This invention relates to improved static inverter circuits for supplying high frequency A.C. power to highly inductive loads such as A.C. motors.

Presently available inverter power supply systems for highly inductive loads appear to possess a number of undesirable operating characteristics and inefficient design aspects. Most conventional systems of this type have poor voltage regulation characteristics due to internal impedance conditions, are inefficient in their utilization of the primary electronic switching devices incorporated therein, and possess unsatisfactory control of their output voltage wave forms under conditions in which good control is required.

Accordingly, it is one object of this invention to provide an improved high frequency inverter power supply circuit having a combination of features which contribute to improve the voltage regulation characteristics of the circuit, make possible better more effective utilization of the primary switching devices, and which bring about a high degree of control of the output voltage wave forms under highly inductive load conditions.

It is another object of the invention to provide an improved inverter power supply circuit which is highly reliable and efficient, yet reasonably simple and economical to install, operate, and maintain.

The objects of the invention are accomplished generally by providing, in an inverter power supply circuit with a high frequency square wave voltage output, a novel current-controlling choke or ballast arrangement which comprises a first means for effectively maintaining the internal impedance of the ballast arrangement at a substantially constant low value for values of load current below a predetermined normal limit, while sharply increasing the internal impedance to limit the current passing therethrough when the value of current rises above the normal value and a second means cooperating with said first means for significantly reducing the average current through the circuit primary switching devices due to periodic resetting or discharge of energy stored in the choke or ballast arrangement. More specifically, the first means comprises a saturable reactor having a first winding forming a part of the basic load current path and a second independently biased winding inductively coupled with the first winding to control the degree of saturation of the reactor and its impedance under the various operating conditions in the circuit. The second means involves a bypass circuit connected across the saturable reactor of the first means and comprising a rectifier device connected to pass a significant portion of periodic resetting current representing discharge of energy stored in the choke or ballast arrangement after the commutation periods, directly back to the supply side of the choke arrangement without loading of the primary switching devices of the inverter circuit.

Other objects and advantages will appear in the following specification wherein reference is made to the accompanying drawing which is a schematic circuit diagram of a three-phase bridge type inverter connected to drive a plurality of synchronous motors such as M1 and M2.

The D.C. supply means 32 is provided as shown with a positive terminal and a negative terminal. A first conductor element 10 is connected to the positive terminal and a second conductor element 11 is connected to the negative terminal. Three parallel branch circuits are connected between the conductor elements 10 and 11. The first of these parallel branch circuits consists of a first inductive winding 42a connected to the first conductor, a first switching device 34, preferably a silicon controlled rectifier connected in series with the winding 42a, a second switching device 35, preferably a silicon controlled rectifier connected in series with winding 42a and switching device 34, and a second inductive winding 42b connected in series with winding 42a, switching device 34, and switching device 35 and also connected to the conductor element 11.

Each of the other two parallel circuit branches is identical with the first with the similar components of each identified by related reference numerals. The motor windings of motors M1 and M2 are connected across center points 20, 21, and 22 between the switching devices 34, 35; 34', 35', and 34", 35" on each of the parallel branch circuits by means of conductor elements 51, 52, and 53. A first resistance unit consisting of resistor 47a connected in parallel with diode string 48a is connected at one end to conductor element 10. A second resistance unit consisting of resistor 47b connected in parallel with diode string 48b is connected at one end to conductor element 11. A first set of feedback diodes 36, 36', and 36" are connected as shown between points 20, 21, and 22 of each parallel branch circuit and the resistance unit formed by resistance element 47a and diodes 48a.

A second set of feedback diodes 37, 37', and 37" are connected as shown between points 20, 21, and 22 of each parallel branch circuit and the resistance unit formed by resistance element 47b and diodes 48b.

A third set of feedback diodes 46a, 46a', and 46a" are connected as shown from points between the inductive windings 42a, 42a', 42a" and the switching devices 34, 34', and 34" of each parallel branch circuit to the resistance unit formed by resistance element 47a and diodes 48a.

A fourth set of feedback diodes 46b, 46b', and 46b" are connected as shown from points between the inductive windings 42b, 42b', and 42b" and the switching devices 35, 35', and 35" of each parallel branch circuit to the resistance unit formed by resistance element 47b and diodes 48b.

A filter capacitance element 39 is connected across the conductor elements 10 and 11, and the power supply.

A first group of capacitance elements 33a, 33a', and 33a" are connected as shown across points 20, 21, 22 and the conductor element 10. A second group of capacitance elements 33b, 33b', and 33b" are connected as shown across points 20, 21, and 22 and the conductor element 11.

As shown in the drawing each of the pairs of inductive windings 42a, 42b; 42a', 42b'; and 42a", 42b" in each parallel circuit branch are inductively coupled by saturable core elements 42k, 42'k, 42"k. Each of these saturable core elements is inductively linked, or coupled, with windings shown at 42c, 42c' and 42c". Windings 42c, 42c', and 42c" are connected as shown in an independent biasing circuit which comprises A.C. supply terminals 55, 55', autotransformer 56, step-down transformer 57, full wave bridge rectifier 58 and choke or ballast device 44.

Each of the switching devices 34, 35, 34', 35', 34", and 35" are controlled by independent control circuits in a conventional manner so that the switching devices in each parallel circuit branch are actuated alternately, and the switching devices in each branch are actuated in predetermined phase sequence to actuate motors M1 and M2.

The independent biasing circuit is energized by application of A.C. power to terminals 55, 55′ to maintain a steady D.C. current $i_1$ through windings 42c, 42c′, and 42c″. This steady current $i_1$ creates in windings 42c, 42c′, and 42c″ and the saturable core elements a magnetic field which produces a limited retarding effect upon normal current $i_2$ below a given predetermined value, through any of the windings 42a, 42a′, 42a″, 42b, 42b′, and 42b″. The magnetic field created by current $i_1$ is in direction and magnitude such that the saturable core elements are driven beyond the saturation point in a direction which is magnetically opposed to the magnetic field created by current $i_2$ in windings 42a, 42′a, and 42″a. In order to simplify the description of the operation of the illustrated system, the function of one of the three phases will be given in detail, it being understood that the function of the other two will be the same though in varied time sequence. The portions of the over-all circuit which are involved with the establishment of the three-phase output are indicated generally at A, B, and C. The discussion of detailed operation will be directed to portion indicated at A.

With the independent biasing circuit and D.C. supply 32 energized the biasing current will be established in windings 42c, 42c′, and 42c″; also the main D.C. supply voltage will be applied across conductor elements 10 and 11. Since the functioning of inverter circuits is well known the general functioning will be discussed but briefly.

Assuming the control circuits controlling switching devices 34 and 35 are in a condition such that switching device 34 is conducting and switching device 35 is blocking or nonconductive, load current $i_2$ will be flowing from conductor element 10, through winding 42a, switching device 34, and conductor 53 to the load windings of the motors M1 and M2. When a current pulse $i_2$ is passing through switching device 34 and winding 42a, it tends to drive point 23 in a positive direction and back bias switching device 35 by means of winding 42b. During the pulse of current passing through switching device 34, a voltage of about twice E will be developed across capacitance element 33b.

Then, to commutate, switching device 35 is actuated into conducting condition by its control voltage circuit (not shown). Since the voltage on the capacitance element 33b cannot change instantaneously, a voltage pulse of 2E will be applied across winding 42b which induces a like pulse across winding 42a which drives point 24 in a negative direction sufficiently for the required time to back bias switching device 34 and render it nonconducting.

Feedback diodes 36 and 37 function conventionally to return or "feedback" to the supply side of the switching device circuits, through the resistance units formed by resistance elements 47a, 47b, and diodes 48a and 48b, the reactive power or energy associated with the inductive windings of the load. This power or energy which is stored in the load inductance during the latter part of a half cycle is returned to the supply side of a switching device circuit during the first part of its next half cycle. This arrangement reduces the need for large commutating capacitance elements and for large D.C. choke or ballast inductance.

Feedback diodes 46a and 46b function to return, through the resistance units, to the input side of their respective windings 42a and 42b, a significant portion of the power or energy stored in each winding following the commutation periods without loading the related switching device 34 or 35. The resistance units formed by resistance elements 47a, 47b, 48a and 48b serve to damp out oscillatory energy discharges received from the feedback diodes 46a, 46b, 36 and 37.

According to this invention, a relationship of the D.C. supply and the independent biasing circuit, together with the other circuit characteristics, is established so that a pulse of load current $i_2$ is initially establilshed against the limited opposing magnetic effects of $i_1$ in the biasing circuit, and a subsequent increase in magnitude of this pulse of load current $i_2$ above a predetermined normal level will desaturate the saturable core associated with the windings of the biasing circuit and establish a much greater current limiting or retarding action on the subsequent portion of the pulse.

In other words, the circuit characteristics of branch A, for example, are selected such that, for the conditions of desired operation, varying current pulses within the range of normal load magnitudes passing through windings 42a and 42b will encounter substantially constant low impedance, due to initial limited retarding effect previously discussed, since the saturable core 42k will still be saturated in the load current opposing direction. However, current pulses having portions of high load magnitudes above the predetermined normal levels, such as those associated with highly inductive loads, will drive the saturable core 42k out of saturation to establish a significant current-limiting condition. With highly inductive loads, these high current peaks occur near the end of a pulse and must be commutated. The establishment of the current-limiting condition or impedance at this portion of the cycle when commutation begins is very desirable and is important to the functioning of the improved arrangement of this invention. The circuit characteristics and operating conditions are selected so that the highest values of current encountered at peak loads cannot drive the saturable core element into saturation in the load current direction.

It is believed that from this description of the functioning of one of the three phases of the system of the invention that the functioning of the entire system will be clear. In addition, it is believed clear that the improved system of this invention increases the useful load current capability of each switching device and enables the use of switching devices, preferably silicon controlled rectifiers, with a reduced rating for a given load current requirement, which reduces the cost of an installation. The improved system of the invention also achieves improved voltage regulation by maintaining a substantially constant low, acceptable value of internal impedance of the saturable reactor units during normal load current values, and sharply limiting higher than normal load or peak values of load current, which peak values, with highly inductive motor loads, almost always occurs at the end of a half cycle just prior to commutation and which must be commutated. Thus, within the limits of normal load current values terminal voltage will not drop off appreciably as load is applied. Consequently, the usual pronounced voltage output waveform distortions, and the undesirable reduction of charge on the commutating capacitor just prior to commutation, which occur as a result of the rate of current changes associated with highly inductive loads, are substantially overcome in the improved system of this invention.

The controlled current during commutation of higher than normal values of load current and the periodic discharge of a significant portion of the energy stored in their associated windings after commutation back to the supply side of the windings, simplifies considerably the design requirements of the components involved and prevents damage to the switching devices, which are highly desirable results.

Although a preferred embodiment of the invention has been described in accordance with the patent laws, many modifications and changes within the spirit of the invention will occur to those skilled in the art and all such are considered to fall within the scope of the following claims.

I claim:

1. An improved current controlling ballast circuit for a high frequency square wave voltage output static inverter power supply for a highly inductive A.C. load, said circuit comprising an inductive winding series connected to said load, a switch element connecting said winding to a D.C. supply, a first means for effectively maintaining the impedance of said winding substantially constant at a low value when predetermined normal magnitude load current is flowing in said winding and increasing the impedance of said winding to a significantly higher value when load current of higher than normal magnitude is flowing in said winding to limit the current passing therethrough, and a second means cooperating with said inductive winding for passing a significant portion of periodic resetting current, developed in said inductive winding and representing a discharge of energy stored in said winding following the inverter commutation periods, directly back to the supply side of the inductive winding, said first means comprising a saturable core element in inductive coupled relationship with said inductive winding, and means cooperating with said core element to saturate said core element in a direction opposing the effects of load current during normal values of load current while permitting greater than normal values of load current to desaturate said core element.

2. An improved inverter circuit for supplying high frequency A.C. power to a highly inductive load, said circuit comprising, in combination: two primary switching devices, each connected in series with a D.C. power means and an inductive A.C. load winding for alternately applying current in reverse directions through said load winding, a current limiting ballast means connected in series with each of said switching devices and said load winding, said ballast means comprising a saturable reactor device, said improved circuit further comprising a shunt circuit connected across said ballast means, said shunt circuit comprising a rectifier device connected in parallel with said saturable reactor device to discharge periodically a significant portion of the energy stored in said reactor device after commutation, directly back to the input side of said reactor device without loading said primary switching devices.

3. The improved inverter circuit of claim 2 in which said shunt circuit further comprises a resistance element connected in series with said rectifier device.

4. The improved inverter circuit of claim 3 in which said saturable reactor device comprises a first inductive winding connected in series with each of said switching devices and said load winding, a saturable core element in inductively coupled relationship with said first inductive winding, and biasing means operatively associated with said core element and said first inductive winding for creating a saturated magnetic field opposing the effects of initial current flow during predetermined normal values of load current in said first inductive winding of said saturable reactor device.

5. The inverter circuit of claim 4 in which said biasing means of said saturable reactor device comprises a second winding inductively coupled with said first inductive winding and said core element, said second winding electrically connected, through a ballast device, to an independent D.C. power supply means of sufficient power rating, to cause said saturation of said saturable reactor device during predetermined normal values of load current while permitting desaturation thereof during higher than normal values of load current.

6. The inverter circuit of claim 5 in which said primary switching devices and said rectifier devices comprise solid state elements.

7. The inverter circuit of claim 6 in which said primary switching devices are silicon controlled rectifiers with independently controlled control circuits.

References Cited
UNITED STATES PATENTS

| | | | |
|---|---|---|---|
| 2,811,688 | 10/1957 | Kittl | 321—49 |
| 3,109,976 | 11/1963 | Sichling | 321—45 X |
| 3,131,343 | 4/1964 | Reinert | 321—16 |
| 3,207,972 | 9/1965 | Love | 321—45 X |
| 3,217,239 | 11/1965 | Lunney | 321—25 X |
| 3,263,154 | 7/1966 | Walker | 321—45 |

JOHN F. COUCH, *Primary Examiner.*

W. M. SHOOP, *Assistant Examiner.*